Nov. 8, 1949     E. M. GREEN     2,487,330

FASTENING DEVICE

Filed Aug. 30, 1943.

INVENTOR.
Emmet M. Green
BY Earl Chappell
ATTORNEYS.

Patented Nov. 8, 1949

2,487,330

UNITED STATES PATENT OFFICE 2,487,330

FASTENING DEVICE

Emmet M. Green, Los Angeles, Calif.

Application August 30, 1943, Serial No. 500,493

3 Claims. (Cl. 24—221)

This invention relates to improvements in fastening devices.

The main objects of this invention are:

First, to provide a fastening device comprising a screw element and a nut element in which the screw element may be engaged with the nut element with a partial rotating movement of the screw element and one which at the same time is very secure.

Second, to provide a fastener device in which the nut element is springable, acting to provide effective longitudinal retaining engagement with the screw element and locking the screw element in its engaged position.

Third, to provide a fastener device having these advantages in which the screw element may be very quickly and easily engaged with the nut element, is effectively retained, and at the same time may be easily and quickly released and replaced as occasion may require.

Fourth, to provide an improved fastening device embodying these features and advantages in which the parts or elements may be economically and rapidly produced.

Fifth, to provide an improved screw element adapted to be engaged with a coacting nut element with a halfturn of the screw element and to be effectively retained by a screw element having yieldable locking members.

Sixth, to provide a fastener nut element for use with a screw fastener element which may be economically and rapidly produced or manufactured from sheet metal stock.

Seventh, to provide a fastener device in which the only change required to adapt it to different thicknesses of work is to lengthen or shorten the screw element.

Objects relating to details and economies of the invention will appear from the description to follow. The invention is defined and pointed out in the claims.

Preferred embodiments of the invention are illustrated in the accompanying drawing, in which.

Figure 1:
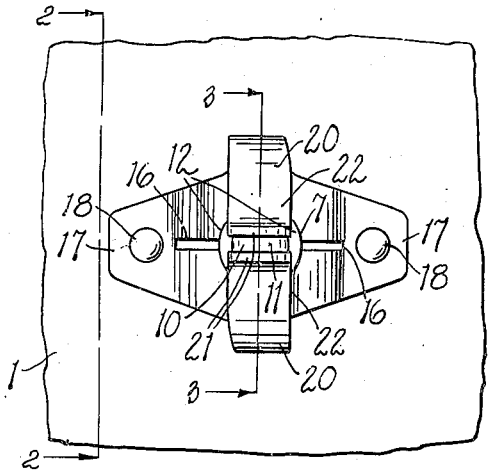
Fig. 1 is a rear view of a fastener device embodying my invention applied to a piece of work and with the screw element in engagement with the nut element.

While my fastener device is capable of wide adaptation and use, I have illustrated it in one adaptation having wide use, namely, the fastening of superimposed pieces of work 1 and 2, 1 being the inner or foundation member of the work and 2 the outer facing or piece of work which is superimposed on and secured to the foundation. Such structures are widely used in airplane structures and various types of structures.

The work member 1 is provided with a conically frustrum-shaped flanged opening 3 therein, the work member or element 2 having a corresponding flanged opening 4 therein, the flanges being shown in nested relation. If desired, a grommet 5 may be provided for the outer member 2. These flanges about the openings are commonly called "dimples." It will be understood that my fastener device is not concerned with these details. However, the flange 4 does provide a countersink for the tapered head 6 of the screw fastener element 7.

The head 6, as illustrated, is provided with a tool slot 8 extending transversely across the same; it will be obvious that any desired form of tool slot or recess or projection can be provided.

The stem or shaft 9 of the fastener element 7 is preferably cylindrical and terminates in a flattened tip 10 of substantial length and width and preferably having a rounded end 11. The width of this tip 10 is preferably the same as the diameter of the stem or shaft 9. The stem or shaft is provided with double threads 12, the outer end 13 of each thread 12 is shown in Fig. 5 and the central portion of one thread 12 is shown between the end portions of the other thread 12 in Fig. 3, the threads in the preferred embodiment being of substantial depth and projecting from the surface of the stem instead of being cut or otherwise formed in the stem.

Figure 2:
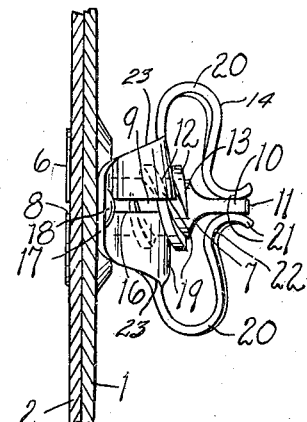
Fig. 2 is a sectional view through the work on line 2—2 of Fig. 1 partially showing the fastener device in elevation.
Figure 3:
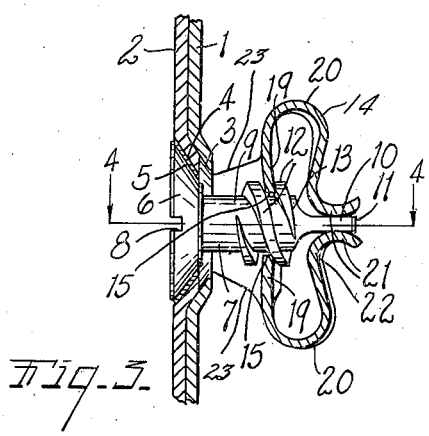
Fig. 3 is a fragmentary view through the fastener device and the work on a line corresponding to line 3—3 of Fig. 1, the screw element being shown in full lines.
Figure 5:
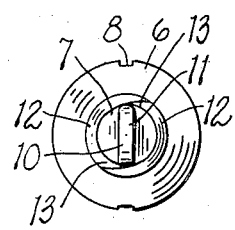
Fig. 5 is an end elevation of the screw element of my fastening device showing the relation of the outer end of each of the double threads to the flattened tip.

These threads 12 have transversely tapered outer ends 13 which terminate on opposite sides of the stem and preferably adjacent the edges of the flattened tip, see Figs. 2, 3 and 5. The advantage of this will be pointed out as the description proceeds.

Figure 6:
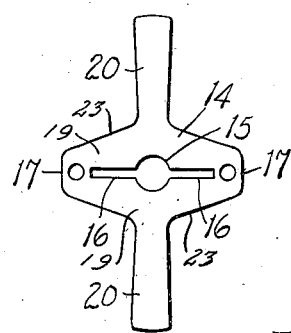
Fig. 6 is a plan view of the blank shown on a small scale from which the nut element of my fastening device is formed.

The fastener element 14 of the embodiment illustrated is formed from a single piece of spring sheet stock, the blanks being shown at 14, Fig. 6. This fastener element has a central opening 15 adapted to receive the stem of the screw element with slots 16 extending oppositely from the opening and longitudinally of the fastener element, these slots terminating adjacent the attaching ears 17 which are adapted to receive the rivets 18 securing the fastener element to the work, although it is evident that the ears might be otherwise secured, or in some instances merely held until the screw fastener element is engaged.

Figure 4:
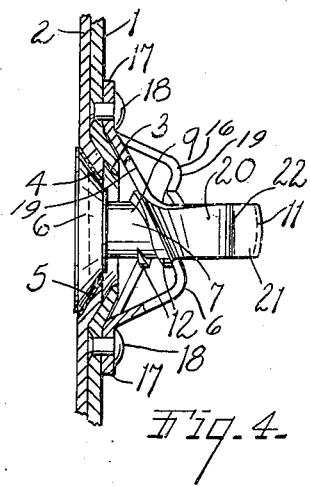
Fig. 4 is a fragmentary view partially in section on line 4—4 of Fig. 3 showing further details of the fastener device, the screw element and the central portion of the fastener element being shown in full lines.

The fastener element is generally rearwardly bowed and the portions 19 thereof constitute thread engaging members, being oppositely inclined or pitched to effectively coact with the threads on opposite sides of the screw element, as shown at 19 in Figs. 3 and 4. These thread engaging members 19 are substantially rigid in effect but they may be springable to such an extent as to provide effective engagement with the threads and secure axial stress on the screw element. This insures effective and ready engagement of the parts and compensates for tolerances and inaccuracies in manufacture. The screw element is in effect rigidly secured against axial stresses when the parts are in engagement.

The thread engaging members have loop-like or bowed spring arms 20 extending oppositely from their outer edges 23, these arms being brought inwardly to an opposed relation relative to the flattened tip of the screw element and preferably terminating in rearwardly turned curved fingers 21 which springably receive the flattened tip 10 between them. The curvature of the fingers extends or merges into the arms at 22 providing a forwardly facing throat having curved walls which coact with the curved end 11 of the screw element in facilitating the entrance of the flattened tip between the fingers and the seating of the screw element. The spring arms 20 being mounted on the outer edges of the springable thread engaging members 19 and being disposed to move bodily in a plane in common with the axis of the screw element facilitates forcing the ends of the arms into tight engagement with the flattened tip of the screw element when the inner edges of the thread engaging members are inwardly canted upon turning the screw element into a tightened locked position.

The thread engaging members are laterally springable to receive the screw element and also to springably support the arms, that is, as the threaded fastener element is manipulated to seating position; the thread engaging members may spring outwardly or laterally as well as the arms being sprung. With the double threads, the threaded fastener element is effectively seated by a rotating snap action, no matter in what position it may be presented to the fastener element. To seat the screw element, all the workman or operator is required to do is to insert the thread element and exert some axial and rotative force. The tip coacting with the spring arms assists in rotating or guiding the screw element so that the threads are effectively positioned to engage the thread engaging members and the spring locking arms coact in the final rotating of the screw element with a snap-like action to seating position. These arms not only serve as locking members but they are of importance in the quick seating of the screw element or in the assembly of the fastener.

In the embodiment of my invention illustrated the parts may be rapidly and economically manufactured; the fastener elements are quickly assembled by a partial rotative and axial thrust movement, the engagement in effect being a snap action engagement. The fastener is highly effective and it cannot be disengaged except with the reverse rotation of the screw. The locking features prevent that occurring without manual manipulation.

Another very valuable feature is that to adapt the fastener device of my invention to different gage or thickness of work it is only necessary to lengthen or shorten the screw element. Threads of about 22½ degree pitch or angle are found to be very practical.

I have illustrated and described a simple and practical embodiment or adaptation of my invention. I have not illustrated or described other embodiments or adaptations which I contemplate as it is believed this disclosure will enable those skilled in the art to embody or adapt my invention as may be desired.

Having thus described my invention, what I claim as new and desire to secure by Letters Patent is:

1. A fastener element for use with a screw threaded fastener element having a flattened tip comprising a one-piece rearwardly bowed nut element of springable material having attaching ears at the ends thereof, and a central screw element receiving opening therein and longitudinal slots extending oppositely from said opening to points adjacent the ears, the portions of the element on opposite sides of the screw opening constituting thread engaging members and being oppositely pitched to coact with threads on opposite sides of a screw element, said thread engaging members having loop-like spring arms extending oppositely from their outer edges and terminating in rearwardly extending opposed fingers adapted to springably receive the flattened tip of a screw element between them, said fingers merging into the arms to provide a forwardly expanding throat, facilitating the entrance of the flattened tip of the screw element between them, said thread engaging members being laterally springable and springably supporting said arms.

2. A fastener element for use with a screw threaded fastener element having a flattened tip comprising a one-piece rearwardly bowed nut element of springable material having attaching ears at the ends thereof and a central screw element receiving opening therein and longitudinal slots extending oppositely from said opening to points adjacent the ears, the portions of the element on opposite sides of the screw opening constituting thread engaging members and being oppositely pitched to coact with threads on opposite sides of a screw element, said thread engaging members having loop-like spring arms extending oppositely from their outer edges and terminating in rearwardly extending opposed fingers adapted to springably receive the flattened tip of a screw element between them when the screw element is partially seated and acting to urge the screw element to fully seated position.

3. A bowed nut fastener element of springable material adapted for use with a threaded fastener element having a flattened tip, the said nut fastener element having a screw element receiving opening therein and slots extending oppositely from said opening, the portions of the element on opposite sides of said opening constituting thread engaging members and being oppositely pitched to coact with threads of a screw element, said thread engaging members having spring arms extending oppositely from their outer edges and terminating in rearwardly extending opposed fingers adapted to springably receive the flattened tip of a screw element between them, said spring arms being disposed generally in a common plane with each other, said plane being disposed substantially at right angles to the plane of the screw element receiving opening and crossing said opening.

EMMET M. GREEN.

REFERENCES CITED

The following references are of record in the file of this patent:

UNITED STATES PATENTS

| Number | Name | Date |
|---|---|---|
| 1,928,469 | Tinnerman | Sept. 26, 1933 |
| 2,183,085 | Richardson | Dec. 12, 1939 |
| 2,204,829 | Shippee et al. | June 18, 1940 |
| 2,258,668 | Zahodiakin | Oct. 14, 1941 |
| 2,279,343 | Reeser | Apr. 14, 1942 |
| 2,306,928 | Bedford, Jr. | Dec. 29, 1942 |
| 2,307,004 | Murphy | Dec. 29, 1942 |
| 2,309,737 | Murphy | Feb. 2, 1943 |
| 2,322,614 | Bedford, Jr. | June 22, 1943 |
| 2,329,909 | Johnson | Sept. 21, 1943 |
| 2,358,005 | Green | Sept. 12, 1944 |
| 2,398,827 | Graham | Apr. 23, 1946 |
| 2,440,790 | Venditty | May 4, 1948 |

FOREIGN PATENTS

| Number | Country | Date |
|---|---|---|
| 847,607 | France | July 3, 1939 |